(12) United States Patent
Moroga et al.

(10) Patent No.: US 11,595,997 B2
(45) Date of Patent: Feb. 28, 2023

(54) USER TERMINAL, RADIO BASE STATION AND RADIO COMMUNICATION METHOD

(71) Applicant: NTT DOCOMO, INC., Tokyo (JP)

(72) Inventors: Hideyuki Moroga, Tokyo (JP); Kazuaki Takeda, Tokyo (JP); Huiling Jiang, Beijing (CN); Liu Liu, Beijing (CN); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/761,874

(22) PCT Filed: Sep. 23, 2016

(86) PCT No.: PCT/JP2016/077957
§ 371 (c)(1),
(2) Date: Mar. 21, 2018

(87) PCT Pub. No.: WO2017/051847
PCT Pub. Date: Mar. 30, 2017

(65) Prior Publication Data
US 2018/0263061 A1  Sep. 13, 2018

(30) Foreign Application Priority Data
Sep. 24, 2015  (JP) .............................. JP2015-187498

(51) Int. Cl.
*H04W 74/08* (2009.01)
*H04W 72/14* (2009.01)
(Continued)

(52) U.S. Cl.
CPC ......... *H04W 74/0833* (2013.01); *H04L 1/189* (2013.01); *H04L 1/1812* (2013.01);
(Continued)

(58) Field of Classification Search
CPC ............ H04W 74/0833; H04W 72/04; H04W 74/08; H04W 72/14; H04W 72/0453; H04L 1/189; H04L 1/1812
(Continued)

(56) References Cited

U.S. PATENT DOCUMENTS

2014/0098761 A1* 4/2014 Lee ..................... H04W 72/005
370/329
2015/0296518 A1* 10/2015 Yi ............................. H04L 1/08
370/336
(Continued)

FOREIGN PATENT DOCUMENTS

WO       2014/206311 A1   12/2014

OTHER PUBLICATIONS

3GPP TSG-RAN WG1 Meeting #82; R1-154216; Source: Sony; Title: On Coverage Level, Coverage Mode & Repetition Level in LC-MTC; Beijing, PR China, Aug. 24-28, 2015. (Year: 2015).*
CN 201510502962.1 filed on Aug. 14, 2015 before EFD of the instant application, Google translation as provided by STIC (Year: 2015).*
(Continued)

*Primary Examiner* — Mohammed S Chowdhury
(74) *Attorney, Agent, or Firm* — Osha Bergman Watanabe & Burton LLP

(57) ABSTRACT

A user terminal is disclosed, where a band to use is limited to a partial narrow band in a system band. The user terminal includes a transmitter that transmits and/or a receiver that receives a signal, and a controller that controls repetitious reception and/or repetitious transmission of a control channel in a random access procedure based on a coverage enhancement level for a random access channel. A radio base station that communicates with a user terminal is also disclosed, where a band to use is limited to a partial narrow band in a system band. The radio base station includes a
(Continued)

|                   |         | TM 1/2                             | TM 9                                |
|-------------------|---------|------------------------------------|-------------------------------------|
| Normal coverage   |         | Align the size of DCI 1A and DCI 1 | Align the size of DCI 1A and DCI 2C |
| Enhanced coverage | w/o ARO | Align the size of DCI 1A and 0                                           ||
|                   | w/ ARO  | Align the size of DCI 1A and DCI 1 | Align the size of DCI 1A and 0      | transmitter that transmits and/or a receiver that receives a signal, and a controller that controls to transmit information to make the user terminal control repetitious reception and/or repetitious transmission of a control channel in a random access procedure based on a coverage enhancement level for a random access channel.

4 Claims, 18 Drawing Sheets

(51) Int. Cl.
  *H04W 72/04* (2009.01)
  *H04L 1/18* (2006.01)
  *H04L 1/1867* (2023.01)
  *H04L 1/1812* (2023.01)
  *H04W 72/0453* (2023.01)

(52) U.S. Cl.
  CPC .......... *H04W 72/04* (2013.01); *H04W 72/14* (2013.01); *H04W 74/08* (2013.01); *H04W 72/0453* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2016/0150570 A1 | 5/2016 | Wang et al. | |
| 2016/0295609 A1* | 10/2016 | Vajapeyam | H04L 5/14 |
| 2016/0316491 A1* | 10/2016 | Axmon | H04W 74/0833 |
| 2016/0330633 A1* | 11/2016 | You | H04J 11/0079 |
| 2016/0353440 A1* | 12/2016 | Lee | H04W 74/0833 |
| 2017/0318478 A1* | 11/2017 | Basu Mallick | H04L 5/0069 |
| 2017/0359838 A1* | 12/2017 | Xiao | H04W 74/0833 |
| 2018/0007658 A1* | 1/2018 | Shen | H04W 72/042 |
| 2018/0070278 A1* | 3/2018 | Uemura | H04W 36/24 |
| 2018/0070403 A1* | 3/2018 | Uemura | H04W 4/70 |
| 2018/0205513 A1* | 7/2018 | Yamamoto | H04L 5/0007 |
| 2018/0249508 A1* | 8/2018 | Gao | H04L 27/2613 |
| 2018/0279341 A1* | 9/2018 | Yamada | H04L 1/1896 |
| 2018/0332566 A1* | 11/2018 | You | H04L 1/0079 |

OTHER PUBLICATIONS

Extended European Search Report issued in corresponding European Patent Application No. 16848635.5, dated Aug. 17, 2018 (11 pages).
LG Electronics, "Considerations on RACH/PRACH transmission for MTC UE", 3GPP TSG RAN WG1 #80bis, R1-151494, Belgrade, Serbia, Apr. 20-24, 2015 (3 pages).
NTT DOCOMO, "Discussion on scheduling of RAR", 3GPP TSG RAN WG1 Meeting #82, R1-154532, Beijing, China, Aug. 24-28, 2015 (4 pages).
InterDigital, "RAR and Paging for Rel-13 MTC", 3GPP TSG RAN WG1 Meeting #79, R1-145050, San Francisco, USA, Nov. 17-21, 2014 (3 pages).
Office Action issued in corresponding Japanese Application No. 2015-187498, dated Nov. 1, 2016 (11 pages).
Sony, "On Coverage Level, Coverage Mode & Petition Level in LC-MTC," 3GPP TSG-RAN WG1 Meeting #82; R1-154216; Beijing, China; Aug. 24-28, 2015; 5 pages.
Ericsson, "Random access for MTC," 3GPP TSG RAN WG1 Meeting #82; R1-153739; Beijing, China; Aug. 24-28, 2015; 5 pages.
3GPP TS 36.300 v12.4.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12); Dec. 2014; 251 pages.
3GPP TR 36.888 v12.0.0; 3rd Generation Partnership Project; Technical Specification Group Radio Access Network; Study on provision of low-cost Machine-Type Communications (MTC) User Equipments (UEs) based on LTE (Release 12); Jun. 2013; 55 pages.
International Search Report issued in International Application No. PCT/JP2016/077957, dated Nov. 1, 2016, 2 pages.
Written Opinion issued in International Application No. PCT/JP2016/077957, dated Nov. 1, 2016, 4 pages.
Office Action issued in the counterpart European Patent Application No. 16848635.5, dated Apr. 17, 2019 (6 pages).
Office Action issued in the counterpart Chinese Patent Application No. 201680055468.8, dated Oct. 9, 2021 (10 pages).
Decision of Rejection issued in Chinese Application No. 201680055468.8; dated Mar. 3, 2022 (10 pages).

* cited by examiner

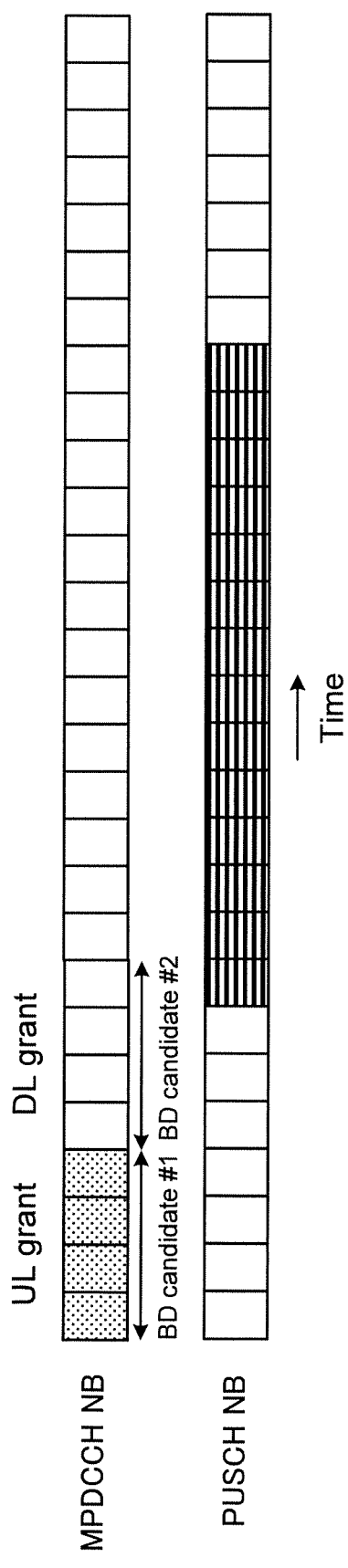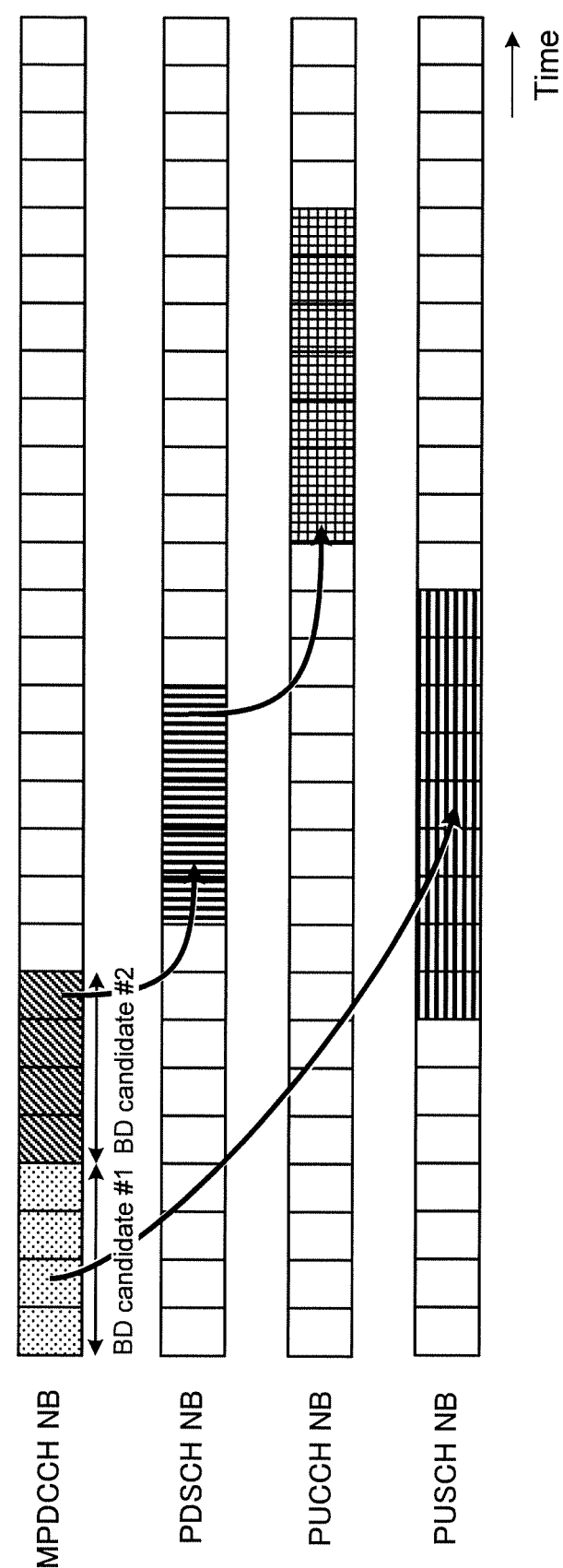
FIG. 5A
FIG. 5B

FIG. 7A

| | Repetition levels for MPDCCH | MPDCCH starting subframe | Repetition level for PUCCH | PUCCH Starting offset |
|---|---|---|---|---|
| Configuration 1 | {5,10,15} | {X1,X2,X3} | 20 | N_1 |
| Configuration 2 | {20,30,40} | {X4,X5,X6} | 50 | N_2 |
| Configuration 3 | {40,60,80} | {X7,X8,X9} | 100 | N_3 |

FIG. 7B

| PRACH CE leve | MPDCCH/PUCCH configuration type |
|---|---|
| PRACH CE level 1 | Configuration 1 |
| PRACH CE level 2 | Configuration 2 |
| PRACH CE level 3 | Configuration 3 |

| DCI Format 0 Field | Rel-12 Number of Bits | Rel-13 MTC UE | |
|---|---|---|---|
| | | Normal coverage | Enhanced coverage |
| Narrow-band Indication | N/A | Maximum 4 bits | NO need |
| RB assignment | 5 | 5 | 5 (or can be compressed) |
| MCS | 5 | 4 (NO 64 QAM) | 3 (QPSK only) |
| NDI | 1 | 1 | 1 |
| TPC Command | 2 | 2 | NO need |
| CSI Request | 1 | 1 | NO need |
| SRS Request | 1 | 1 | NO need |
| Differentiation Flag | 1 | FFS | FFS |
| Repetition level of PUSCH | N/A | FFS | FFS |
| Repetition level of MPDCCH | N/A | FFS | FFS |
| Padding Bits for DCI 0 = DCI 1A | - | FFS | FFS |
| Frequency hopping pattern | N/A | NO need | NO need |
| CS and OCC Index | 3 | NO need | NO need |
| FH Flag | 1 | No need | No need |
| CRC | 16 | 16 | 16 |
| Total | 36 | ~34 bits | ~25 bits |

FIG. 8

| DCI Format 1A Field | Rel-12 Number of Bits | Rel-13 MTC UE | |
|---|---|---|---|
| | | Normal coverage | Enhanced coverage |
| Narrow-band Indication | N/A | Maximum 4 | NO need |
| RB assignment | 5 | 5 | 5 (or can be compressed) |
| MCS | 5 | 4 | 3 |
| NDI | 1 | 1 | 1 |
| HPN | 3 | 3 | |
| RV | 2 | 2 | NO need |
| TPC | 2 | 2 | NO need |
| SRS Request | 1 | 1 | NO need |
| ARO | 2 | FFS | FFS |
| Differentiation Flag | 1 | FFS | FFS |
| Padding Bits for DCI 0 = DCI 1A | - | FFS | FFS |
| Repetition level of PDSCH | N/A | FFS | FFS |
| Repetition level of MPDCCH | N/A | FFS | FFS |
| Frequency hopping pattern | N/A | FFS | FFS |
| Distributed/Localized Flag | 1 | NO need | NO need |
| CRC | 16 | 16 | 16 |
| Total | 38 bits | ~38 bits | ~25 bits |

FIG. 9

| DCI Format 1 Field | Rel-12 Number of Bits | Rel-13 MTC UE | |
|---|---|---|---|
| | | Normal coverage | Enhanced coverage |
| Narrow-band Indication | N/A | Maximum 4 | NO need |
| RB assignment | 6 | 6 | 6 (or can be compressed) |
| MCS | 5 | 4 | 3 |
| NDI | 1 | 1 | 1 |
| HPN | 3 | 3 | NO need |
| RV | 2 | 2 | NO need |
| TPC | 2 | 2 | NO need |
| ARO | 2 | FFS | FFS |
| Padding Bits for Ambiguous Size | - | FFS | FFS |
| Repetition level of PDSCH | N/A | FFS | FFS |
| Repetition level of MPDCCH | N/A | FFS | FFS |
| Frequency hopping pattern | N/A | NO need | FFS |
| CRC | 16 | 16 | 16 |
| Total | 37 | ~38 bits | ~26 bits |

FIG. 10

| DCI Format 2C Field | Rel-12 Number of Bits | Rel-13 MTC UE | |
|---|---|---|---|
| | | Normal coverage | Enhanced coverage |
| Narrow-band Indication | N/A | Maximum 4 | NO need |
| RB assignment | 6 | 6 | 6 (or can be compressed) |
| AP, scrambling ID and number of layer | 3 | 2 (Can be reduced) | 2 (Can be reduced) |
| HPN | 3 | 3 | NO need |
| TPC | 2 | 2 | NO need |
| Padding Bits for Ambiguous Size | - | FFS | FFS |
| MCS of TB1 | 5 | 4 | 3 |
| NDI of TB1 | 1 | 1 | 1 |
| RV of TB 1 | 2 | 2 | NO need |
| MCS of TB2 | 5 | NO need | NO need |
| NDI of TB2 | 1 | NO need | NO need |
| RV of TB 2 | 2 | NO need | NO need |
| ARO | 2 | FFS | FFS |
| Repetition level of PDSCH | N/A | FFS | FFS |
| Repetition level of MPDCCH | N/A | FFS | FFS |
| Frequency hopping pattern | N/A | NO need | FFS |
| CRC | 16 | 16 | 16 |
| Total | 48 bits | ~40 bits | ~28 bits |

FIG. 11

| DCI | DCI 0 | DCI 1A | DCI 1 | DCI 2C |
|---|---|---|---|---|
| Normal coverage (w/o and w/ ARO) | 34 | 38 / 40 | 38 / 40 | 40 / 42 |
| Enhanced coverage (w/o and w/ ARO) | 25 | 25 / 27 | 26 / 28 | 28 / 30 |

| | TM 1/2 | TM 9 |
|---|---|---|
| Normal coverage | Align the size of DCI 1A and DCI 1 and DCI 0 | Align the size of DCI 1A and DCI 2C and DCI 0 |
| Enhanced coverage | | |

FIG. 13B

| | | TM 1/2 | TM 9 |
|---|---|---|---|
| Normal coverage | | Align the size of DCI 1A and DCI 1 | Align the size of DCI 1A and DCI 2C |
| Enhanced coverage | w/o ARO | Align the size of DCI 1A and DCI 1 | Align the size of DCI 1A and 0 |
| | w/ ARO | Align the size of DCI 1A and DCI 1 | Align the size of DCI 1A and 0 |

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, the specifications of LTE-A (also referred to as LTE-advanced, LTE Rel. 10, 11 or 12) have been drafted for further broadbandization and increased speed beyond LTE (also referred to as LTE Rel. 8 or 9), and successor systems of LTE (also referred to as, for example, FRA (Future Radio Access), 5G (5th generation mobile communication system), LTE Rel. 13 and so on) are under study.

Now, accompanying the cost reduction of communication devices in recent years, active development is in progress in the field of technology related to machine-to-machine communication (M2M) to implement automatic control of network-connected devices and allow these devices to communicate with each other without involving people. In particular, 3GPP (3rd Generation Partnership Project) is promoting the standardization of MTC (Machine-Type Communication) for cellular systems for machine-to-machine communication, among all M2M technologies (see non-patent literature 2).

In the standardization, various functions to be equipped with terminals employed for MTC (MTC terminal) have been under study, and, for example, terminals, in which a transmission/reception bandwidth is limited, have been under study for the purpose of cost reduction. As another example, since there is a possibility that MTC terminals are located deep inside a building or in the underground where a building penetration loss is large and which are hard to carry out radio communication, MTC terminals targeting coverage enhancement has been also under study.

Based on the above two examples, MTC terminals (MTC UE (User Equipment)) are classified into the following four types of terminals: (1) terminal that has no limitation on a transmission/reception bandwidth and has no coverage enhancement function; (2) terminal that has limitation on a transmission/reception bandwidth and has no coverage enhancement function; (3) terminal that has no limitation on a transmission/reception bandwidth and has a coverage enhancement function; and (4) terminal that has limitation on a transmission/reception bandwidth and has a coverage enhancement function. MTC terminals are being studied for use in a wide range fields such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2" Non-Patent Literature 2: 3GPP TR 36.888 "Study on provision of low-cost Machine-Type Communications (MTC) User Equipments (UEs) based on LTE (Release 12)"

SUMMARY OF INVENTION

Technical Problem

As a method for coverage enhancement, application of repetitious transmission (repetition) that enhances a signal-to-interference plus noise ratio (SINR) by transmitting the same signals in repetitions over a plurality of subframes on the downlink (DL) and/or the uplink (UL) is considered. For example, when a radio base station (eNB: eNode B) transmits a predetermined signal in repetitions, an MTC terminal performs receiving processes (demodulation, decoding and so on) by power synthesizing received signals.

However, when repetitious transmission is applied to a control channel, communication is not carried out adequately and there is a threat that the throughput decreases. In addition, spectral efficiency may be damaged due to the occurrence of unnecessary retransmission.

The present invention has been made in view of the above, and it is therefore an object of the present invention to provide a user terminal, a radio base station, and a radio communication method, whereby adequate communication can be performed even when repetitious transmission is applied to a control channel.

Solution to Problem

According to one aspect of the present invention, a user terminal, in which a band to use is limited to a portion of a narrower band of a system band, has a transmitting/receiving section that transmits and/or receives signals, and a control section that controls repetitious reception and/or repetitious transmission of a control channel in the random access procedure based on the coverage enhancement level for the random access channel.

Advantageous Effects of Invention

According to the present invention, even when repetitious transmission is applied to a control channel, adequate communication can be performed.

BRIEF DESCRIPTION OF DRAWINGS

FIGS. 5A and 5B are diagrams to show another example of a process according to embodiment 1.1 of the present invention and an example of a process according to embodiment 1.2 of the present invention;

FIGS. 7A and 7B are diagrams to show an example of the relationship employed in a second embodiment;

FIG. 8 is a diagram to show an example of a configuration of Rel. 12 and a configuration of an MTC terminal in Rel. 13 for DCI format 0;

FIG. 9 is a diagram to show an example of a configuration of Rel. 12 and a configuration of an MTC terminal in Rel. 13 for DCI format 1A;

FIG. 10 is a diagram to show an example of a configuration of Rel. 12 and a configuration of an MTC terminal in Rel. 13 for DCI format 1;

FIG. 11 is a diagram to show an example of a configuration of Rel. 12 and a configuration of an MTC terminal in Rel. 13 for DCI format 2C;

FIG. 12 is a diagram to show an example of DCI format size shown in FIGS. 8 to 11;

FIGS. 13A and 13B are diagrams to show an example of combinations of DCI formats for size alignment in a third embodiment;

DESCRIPTION OF EMBODIMENTS

Studies are in progress to simplify the hardware structures of MTC terminals at the risk of lowering their processing capabilities. For example, studies are in progress to lower the peak rate, limit the transport block size, limit the resource blocks (also referred to as "resource blocks (RBs)," "physical resource blocks (PRBs)", and so on), and limit the RFs to receive, and so on, in low-cost MTC terminals (LC(Low-Cost)-MTC UE) in which a transmission/reception bandwidth is limited, in comparison to existing user terminals (LTE terminals).

Low-cost MTC terminals can be implemented by limiting the bands to use in the uplink (UL) and the downlink (DL) to partial narrow bands (NBs) in a system band. A system band is equivalent to, for example, an existing LTE band (for example, 20 MHz), a component carrier (CC) and so on. Note that a low-cost MTC terminal may be simply referred to as an "MTC terminal," and descried as an MTC terminal hereinafter. Also, existing user terminals may be referred to as "normal UEs," "non-MTC UEs," and so on.

Unlike existing user terminals, in which the system band (for example, 20 MHz (100 PRBs), one component carrier, etc.) is configured as the upper limit band for use, the upper limit band for use for MTC terminals is limited to a predetermined narrow band (for example, 1.4 MHz (6 PRBs), 200 kHz (1 RB), etc.). Studies are in progress to run such band-limited MTC terminals in LTE/LTE-A system bands, considering the relationship with existing user terminals.

For example, LTE/LTE-A system bands support frequency-multiplexing of band-limited MTC terminals and band-unlimited existing user terminals. Consequently, MTC terminals may be seen as terminals in which the maximum band to be supported is partial narrow bands in a system band, or may be seen as terminals that have the functions for transmitting/receiving in narrower bands than LTE/LTE-A system bands.

Figure 1:
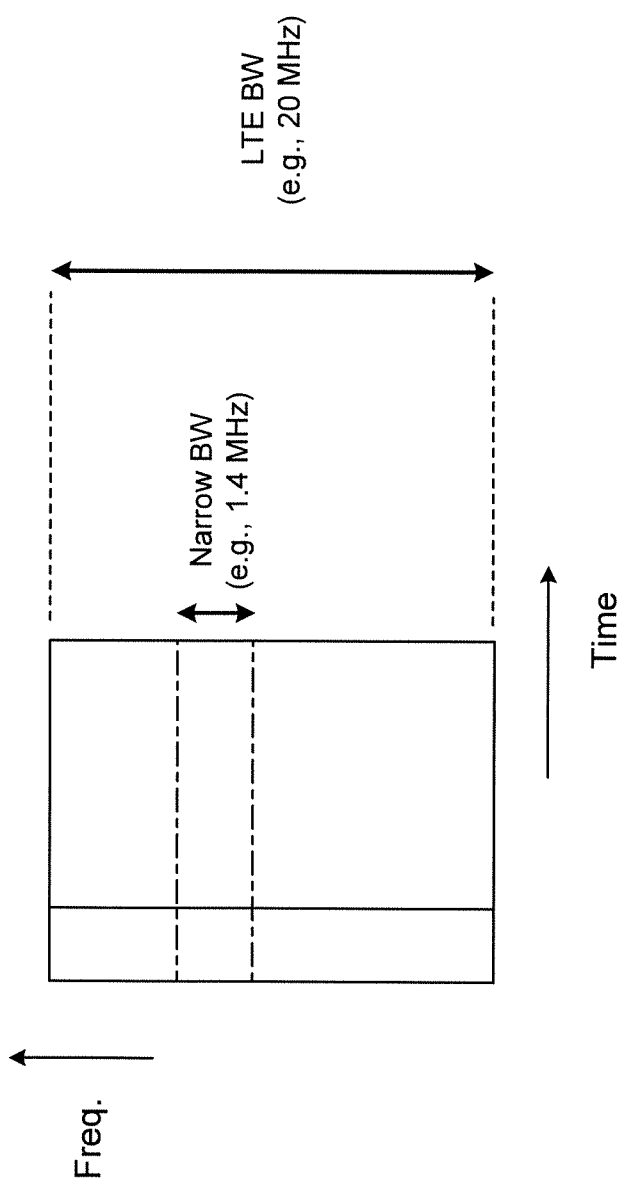
FIG. 1 is a diagram to show an example arrangement of a narrow band in a system band.

FIG. 1 is a diagram to show an example arrangement of a narrow band in a system band. In FIG. 1, a predetermined band (for example, 1.4 MHz), which is narrower than an LTE system band (for example, 20 MHz), is configured in a portion of a system band. This band is a frequency band that can be detected by MTC terminals.

Note that it is preferable to employ a structure, in which the frequency location of a narrow band that serves as a band for use by MTC terminals can be changed within the system band. For example, MTC terminals should preferably communicate by using different frequency resources per predetermined period (for example, per subframe). By this means, it is possible to achieve traffic offloading for MTC terminals, achieve a frequency diversity effect, and reduce the decrease of spectral efficiency. Consequently, considering the application of frequency hopping, frequency scheduling and so on, MTC terminals should preferably have an RF re-tuning function.

Note that different frequency bands may be used between the narrow band to use in downlink transmission/reception (DL NB: Downlink Narrow Band) and the narrow band to use in uplink transmission/reception (UL NB: Uplink Narrow Band). Also, the DL NBs may be referred to as the "downlink narrow band," and the UL NB may be referred to as the "uplink narrow band."

MTC terminals receives downlink control information (DCI) by using a downlink control channel that is placed in a narrow band, and this downlink control channel may be referred to as an "EPDCCH" (Enhanced Physical Downlink Control CHannel) or may be referred to as an "MPDCCH" (MTC PDCCH).

Also, MTC terminals receive downlink data by using a downlink shared channel (downlink data channel) that is placed in a narrow band, this downlink shared channel may be referred to as a "PDSCH" (Physical Downlink Shared CHannel) or may be referred to as an "MPDSCH" (MTC PDSCH).

Also, an uplink control channel (for example, a PUCCH (Physical Uplink Control CHannel)) and an uplink shared channel (for example, a PUSCH (Physical Uplink Shared CHannel)) for MTC terminals may be referred to as an "MPUCCH" (MTC PUCCH) and an "MPUSCH" (MTC PUSCH), respectively. The above channels are by no means limiting, and any channel that is used by MTC terminals may be represented by affixing an "M," which stands for MTC, to existing channels used for the same purpose.

Also, in the conventional LTE, control information for unspecified terminals (for example, system information block (SIB: System Information Block) is stored in a PDSCH and radio resources that store control information for specific terminals are designated using a PDCCH. Meanwhile, for control information for MTC terminals, studies are in progress to fixedly allocate radio resources without using a PDCCH or an EPDCCH.

When receiving control information under such a condition, MTC terminals need to know information for designating the positions of subframes to which control information is transmitted, the location in the frequency direction, a transport block size (TBS), and a modulation scheme (MCS: Modulation and Coding Scheme) in advance. Also, it is possible to provide SIBs for MTC terminals, and these SIBs may be referred to as "MTC-SIBs."

Now, application of coverage enhancement (CE) to radio communication for MTC terminals has been studied. For example, for MTC terminals, coverage improvement up to 15 dB compared to existing user terminals has been studied.

As a coverage enhancement method in radio communication for MTC terminals, it may be possible to apply, for example, a method of transmitting the same signals (for example, transport block) in repetitions (repetition) in the downlink (DL) and/or the uplink (UL), or a method of transmitting signals having the same codeword and different RVs (Redundancy Version) in repetitions. It is assumed that, depending on communication environment, the number of repetitious transmissions (repetition number) increases in order to achieve desired coverage characteristics (for example, maximum 15 dB coverage).

Signals transmitted in repetitions are synthesized on the receiving side and used for receiving processes (for example, demapping, demodulation, decoding, and so on). By this means, the received signal quality can be enhanced. Note that, reception of signals transmitted in repetition is referred to as "repeated reception," or "synthetic reception," and so on.

A radio base station can report information about a repetition number for uplink signals (for example, PUSCHs) and/or downlink signals (for example, PDSCHs) to MTC terminals by means of one of broadcast information (MIBs (Master Information Block), and SIBs), higher layer signaling (for example, RRC (Radio Resource Control) signaling), and downlink control information (DCI: Downlink Control Information), or combination of these.

Also, the repetition number can be determined for each signal according to a repetition level. Here, a repetition level is information about a repetition number, and the repetition level may be, for example, the number of repetitions itself, or may be predetermined information associated with the repetition number (for example, an index). A radio base station can report information about the relationship between the repetition level and the repetition number to MTC terminals, by utilizing higher layer signaling (for example, RRC signaling, and broadcast information), downlink control information (DCI), or combination of these.

Note that the relationship may be commonly employed among all cells, or defined for each cell. Also, information about the relationship may be configured in a radio base station and user terminals in advance. Furthermore, the repetition number/level may be separately configured/determined for each channel (for example, differently).

Also, coverage enhancement levels (CE level) may be determined in order to indicate the setting of coverage enhancement. For example, the coverage enhancement level is configured so that, the repetition number varies depending on the CE level. The number of CE levels is possibly set to, for example, three, but is by no means limited to this. The coverage enhancement level may be determined so that, UEs which do not employ coverage enhancement (no repetition), correspond to "no CE level" (or CE level 0), and UEs which employ coverage enhancement correspond to CE level 1 to 3.

Now, in the downlink control channel in existing systems (PDCCH/EPDCCH), UEs monitor a plurality of PDCCH/EPDCCH candidates in one subframe and detect a downlink control signal (blind decoding). The set of PDCCH/EPDCCH candidates to be monitored may be referred to as a "search space (SS)." A search space which is different for each UE, may be referred to as a "user terminal specific search space (USS: UE-specific Search Space)." Also, search spaces shared between a plurality of UEs may be referred to as a "CSS (Common Search Space)."

As a downlink control signal, DCI, such as, for example, downlink transmission (PDSCH) scheduling information (also, referred to as a "DL grant," a "DL assignment"), uplink transmission (PUSCH) scheduling information (also, referred to as a "UL grant"), and so on is reported.

One PDCCH/EPDCCH candidate is composed of one or more CCEs (Control Channel Element)/CCEs (Enhanced CCE). The number of CCE/ECCEs in the PDCCH/EPDCCH candidate is referred to as the "aggregation level (AL)." For example, AL=1, 2, 4, 8 is employed in the USS of an existing PDCCH/EPDCCH.

Meanwhile, in LTE Rel. 13, studies are in progress to support a plurality of repetition levels for an MPDCCH by MTC terminals which employ coverage enhancement (enhanced mode). In this case, while the search spaces for existing systems are defined in the frequency domain in one subframe based on the AL, a search space for an MPDCCH (for example, a USS for an MPDCCH) may be expanded to a plurality of subframes based on the repetition level. Note that, in MTC terminals in a coverage enhancement mode, supporting only a predetermined AL (for example, only AL=24) is also under study; however, supporting a plurality of ALs may be possible.

Figure 2:
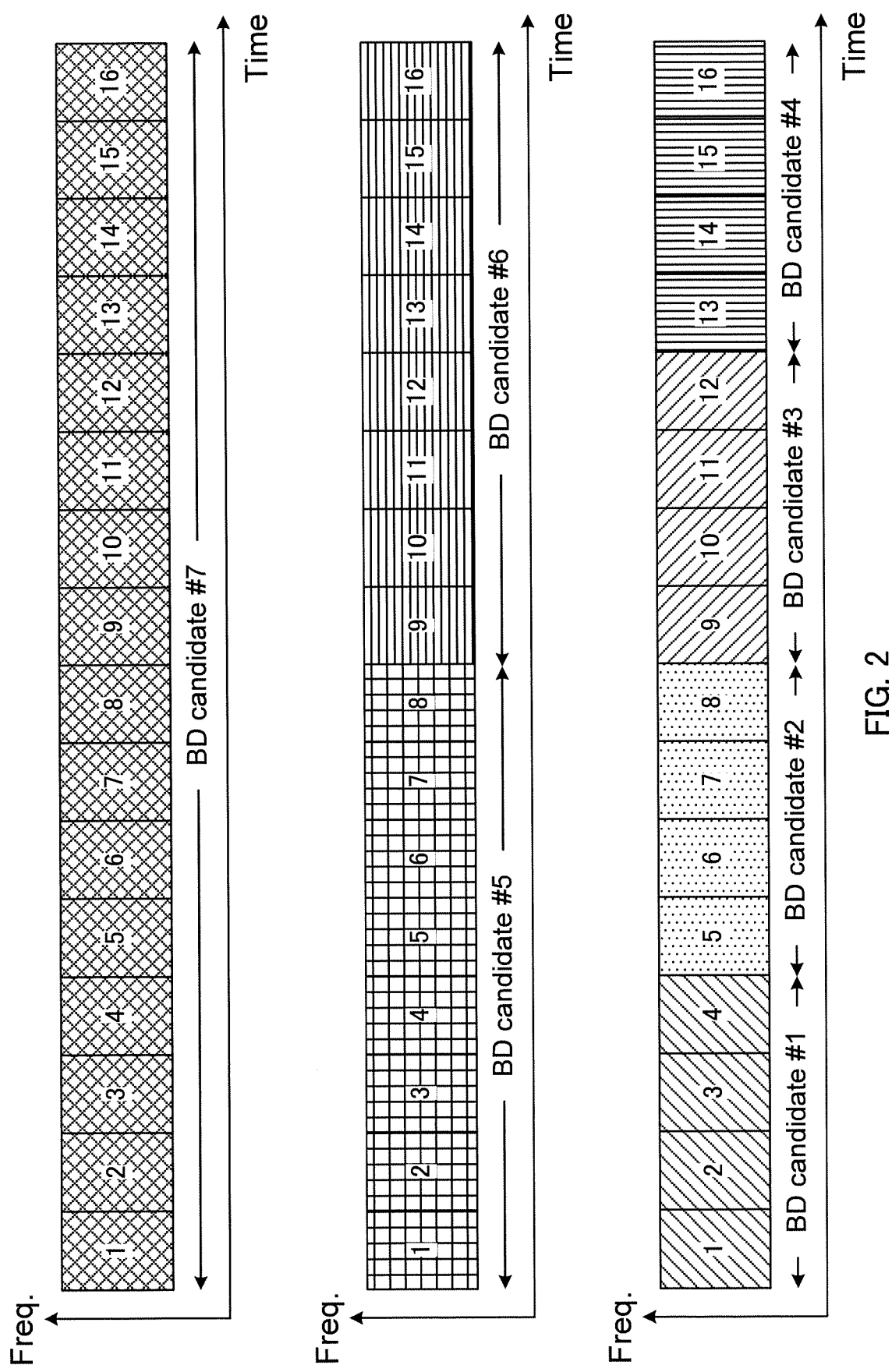
FIG. 2 is a diagram to show an example of a search space for an MPDCCH.

FIG. 2 is a diagram to show an example of a search space of an MPDCCH. FIG. 2 shows MPDCCH candidates to be allocated to the same time/frequency resources (search space). The MPDCCH candidate may be referred to as a "blind decoding candidate (BD candidate)," a "candidate region," and so on. FIG. 2 shows 16 subframes, and the number assigned to each subframe is, for example, a predetermined subframe index.

In FIG. 2, BD candidates #1 to #4 corresponding to repetition number=4 are continuously arranged on a time basis as a BD candidate, BD candidates #5 to #6 corresponding to repetition number=8 are continuously arranged on a time basis, and BD candidate #7 corresponding to repetition number=16 is arranged. BD candidates with the same repetition number each have a different starting subframe for repetitious transmission. A UE attempts to decode BD candidates and acquire DCI that has been successfully decoded through the synthesis of the MPDCCH.

MTC terminals in LTE Rel. 13 monitor BD candidates that has defied and/or configured in advance, detect DCI, and control a transmission process and/or receiving process based on the DCI. Here, when the MTC terminal detects DCI in a plurality of BD candidates in the same USS, a transmission process and/or a receiving process may be controlled based on each DCI.

With MTC terminals in LTE Rel. 13, studies are in progress to employ normal FDD (Full duplex FDD) as a duplex scheme in addition to HD-FDD (Half Duplex Frequency Division Duplexing) or TDD (Time Division Duplexing). Note that, even when employing Full duplex FDD, MTC terminals cannot perform simultaneous reception in a plurality of NBs or simultaneous transmission in a plurality of NBs, in a case where the transmission bandwidth and the reception bandwidth are limited to respective predetermined NBs.

However, when downlink control signals by using the SS of MPDCCH (for example, a USS) based on the repetition level as shown in FIG. 2, such a simultaneous reception/transmission may occur.

FIG. 3 is a diagram to show an example where a plurality of receptions or a plurality of receptions transmissions occur in MTC terminal. FIG. 3 shows an example where an MTC terminal uses channels (MPDCCH, PDSCH, PUCCH, PUSCH, and so on) in different NBs. In FIG. 3, BD candidates #1 and #2 corresponding to repetition number=4 are defined as a USS in the NB used in an MPDCCH (MPDCCH NB).

Figure 3A:
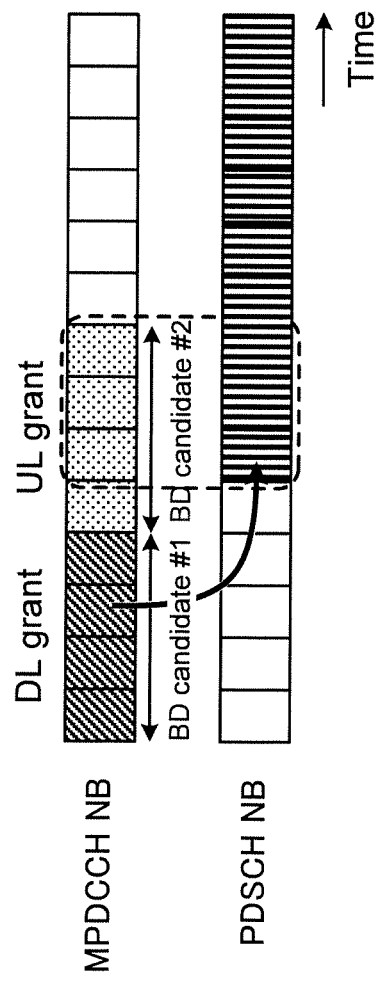
FIGS. 3A and 3B are diagrams to show an example where a plurality of receptions or transmissions occur in an MTC terminal.

FIG. 3A shows a case where a DL grant is detected first in a USS. After detecting a DL grant in BD candidate #1, an MTC terminal performs processes such as retuning for a predetermined period of time (for example, 1 ms), and then attempts to perform receiving processes in a PDSCH NB resource indicated by the corresponding DL grant. When the DL grant includes information about the repetition level, for example, the MTC terminal may determine the PDSCH repetition level based on the information and perform a receiving process of a PDSCH.

In the USS of existing systems, there are cases where a plurality of grants (for example, a DL grant and a UL grant) are detected in the same USS. For this reason, as shown in FIG. 3A, another grant (for example, a UL grant) may be reported by BD candidate #2. However, in the period enclosed by the broken line in FIG. 3A, the MTC terminal gives up either MPDCCH or PDSCH reception due to necessity for simultaneous reception in a plurality of NBs.

In this case, an eNB, which is a communication party, cannot identify which reception the MTC terminal gives up, and therefore the problem arises that inadequate control is performed between a UE and an eNB.

Figure 3B:
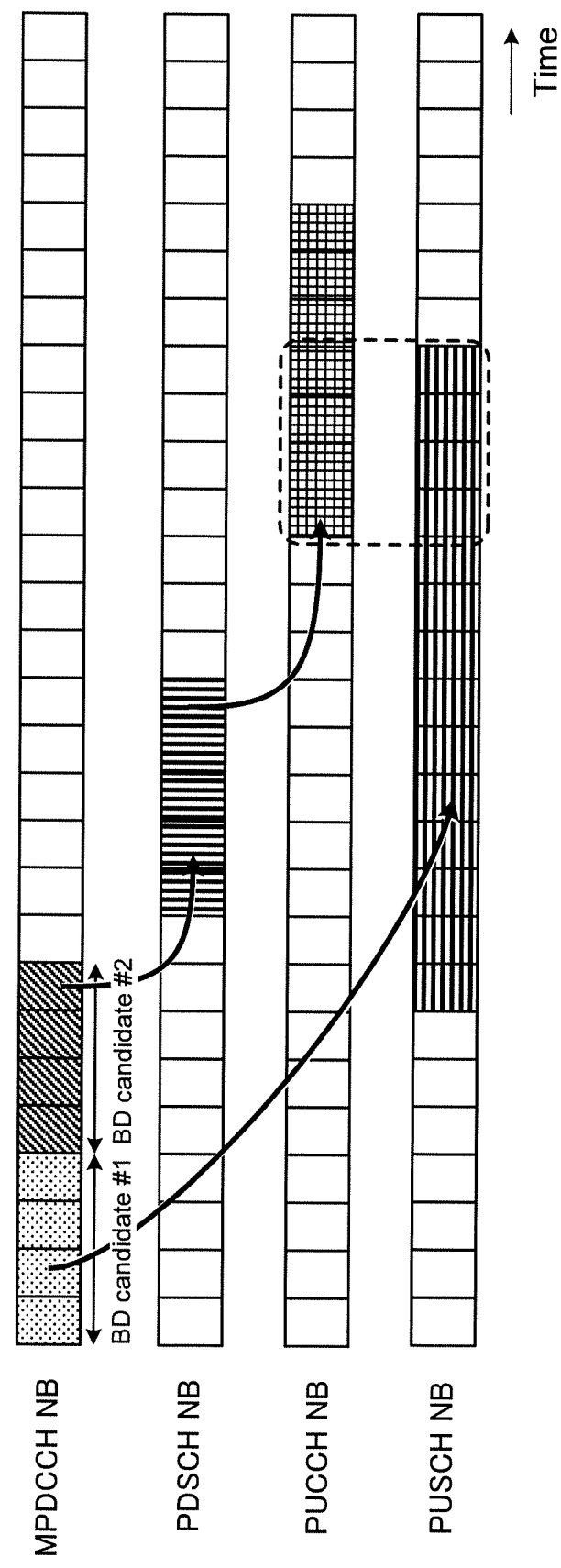

In addition, FIG. 3B shows a case where a UL grant is detected first in a USS. After a predetermined period has passed from the detection of a UL grant in BD candidate #1 (for example, after 4 ms), an MTC terminal starts to perform repetitious transmission in the PUSCH NB resources indicated by the UL grant. When the UL grant includes information about the repetition level, for example, the MTC terminal may determine the PUSCH repetition level based on the information and perform a PUSCH transmission process.

As shown in FIG. 3B, it may be possible to report another grant (for example, a DL grant) in BD candidate #2. Also, the MTC terminal feeds back delivery acknowledgement information in a predetermined resource according to the reception result of PDSCH (decoding result) after a predetermined period has passed from the completion of the PDSCH reception (for example, after 4 ms). Here, delivery acknowledgement information may be referred to as "HARQ-ACK (Hybrid Automatic Repeat reQuest-Acknowledgement)," "ACK/NACK (A/N)," "retransmission control information," and so on.

For example, when transmitting delivery acknowledgement information using a PUCCH in the PUCCH NB, in the period enclosed by the broken line in FIG. 3A, simultaneous transmission in a plurality of NBs is required. Therefore, the MTC terminal gives up either PUCCH or PUSCH transmission.

In this case, an eNB, which is a communication party, cannot identify which transmission the MTC terminal gives up, and therefore there is a risk that inadequate control may be performed between a UE and an eNB. Note that, when delivery acknowledgement information is transmitted not in the PUCCH NB, but in another PUSCH NB, the same problem arises.

For this reason, when repetitious transmission is applied to a control channel, there is a threat that communication control is not carried out adequately, and as a result, the throughput decreases. In addition, due to the occurrence of unnecessary retransmission, spectral efficiency may be damaged.

So, the present inventors have come up with the idea of performing transmission control of scheduling information (grant), considering repetitious transmission of a control channel or other channels. According to one embodiment of the present invention, it is possible to preferably prevent the occurrence of simultaneous reception in a plurality of NBs or simultaneous transmission in a plurality of NBs.

Furthermore, the present inventors further worked on a control channel process of MTC terminals and found a method of configuring repetitious transmission/reception of a control channel, and a method of adjusting a DCI format considering coverage.

Now, embodiments of the present invention will be described below. Hereinafter, when simply described as a "UE," it represents an MTC terminal in which a band to use is limited to a narrow band, but the application of the present invention is not limited to the MTC terminal. Furthermore, although 6-PRB (1.4-MHz) narrow bands will be described below, the present invention can be applied to other narrow bands as well, based on the present description.

Radio Communication Method

First Embodiment

A first embodiment of the present invention relates to a method of detecting DCI in a UE. To be more specific, in the first embodiment, when a UE detects uplink transmission scheduling information (UL grant) and/or downlink reception scheduling information (DL grant) (in the case where reception has completed) in a predetermined candidate region (BD candidate) in a search space, the UE controls a decoding process in the remaining candidate region in the search space.

When the UE detects a certain grant in a predetermined BD candidate in a USS, the UE may stop an MPDCCH detecting process (blind decoding process) in the remaining BD candidate, assuming that the same USS does not include any other grant (embodiment 1.1). Also, if the UE detects a UL grant in a predetermined BD candidate in a USS, the UE may perform a DL grant detecting process (blind decoding process) in the remaining BD candidate in the same USS under a predetermined condition (that is, in the case of satisfying a predetermined condition) (embodiment 1.2).

For example, when the repetition number for uplink transmission (PUSCH transmission) indicated by a UL grant is less than (not greater than) the sum of the total repetition numbers of the remaining BD candidate in the same USS and the maximum repetition number of the PDSCH, a UE may control to perform DL grant detecting process in the remaining BD candidate.

Note that the predetermined condition is not limited to the above described condition, and the condition has only to be one in which PUSCH transmission indicated by the UL grant does not overlap, on a time basis, with HARQ-ACK transmission corresponding to the PDSCH, indicated by the DL grant in the remaining BD candidate. For example, the condition may be determined taking into account NB retuning time, a predetermined period from the completion of PDSCH reception to feedback of delivery acknowledgement information, and so on in addition to the above described repetition number.

In embodiment 1.1, when an eNB transmits a certain grant to a predetermined UE by a predetermined BD candidate in a USS, the eNB should preferably control not to transmit another grant in the remaining BD candidate in the same USS. Also, in embodiment 1.2, when an eNB transmits a UL grant to a predetermined UE by a predetermined BD candidate in a USS, the eNB should preferably control DL grant transmission in the remaining BD candidate in the same USS under a predetermined condition. This configuration allows a reduction in overhead due to unnecessary grant transmission.

Figure 4:
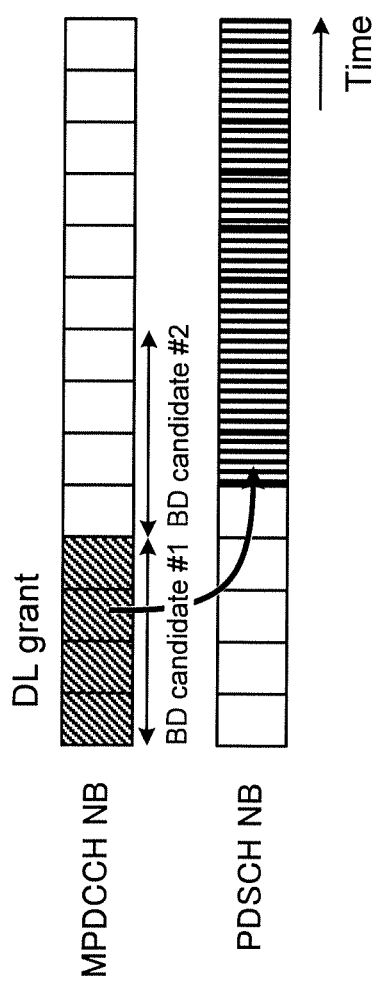
FIG. 4 is a diagram to show an example of a process according to embodiment 1.1 of the present invention.

FIG. 4 is a diagram to show an example of a process according to embodiment 1.1 of the present invention. FIG. 4 is similar to FIG. 3A, and the difference there between will be described hereinafter. When a UE detects a DL grant in BD candidate #1, the UE does not perform a blind decoding process in the remaining BD candidate, assuming that the remaining BD candidate (BD candidate #2) does not include any other grant (for example, a UL grant and/or a DL grant). For this reason, when the UE attempts to perform a receiving process in the PDSCH NB resource indicated by the DL grant, it is possible to prevent the occurrence of simultaneous reception with the MPDCCH.

FIG. 5 is a diagram to show another example of a process according to embodiment 1.1 of the present invention and an example of a process according to embodiment 1.2 of the present invention. FIG. 5A corresponds to a case where DL grant detection is not performed in BD candidate #2 in the example in FIG. 3B. To be more specific, when a UE detects a UL grant in BD candidate #1, the UE does not perform a blind decoding process in the remaining BD candidate, assuming that the remaining BD candidate (BD candidate #2) does not include any other grant (for example, a DL grant and/or a UL grant). For this reason, when the UE attempts to perform a transmission process in the PUSCH NB resource indicated by the UL grant, it is possible to prevent the occurrence of simultaneous transmission with the PUCCH (HARQ-ACK) corresponding to the PDSCH indicated by the DL grant, for example.

FIG. 5B is similar to FIG. 3B, and the difference there between will be described hereinafter. In FIG. 5B, the repetition number (9 times) for PUSCH transmission indicated by the UL grant is smaller than the repetition number (14 times) for PUSCH transmission in FIG. 3B. Then, the repetition number for PUSCH transmission in FIG. 5B (9 times) is less than the sum of the total repetition numbers of the remaining BD candidate (BD #2) in the same USS (4 times) and the maximum repetition number of the PDSCH (in this example, 5 times).

Accordingly, in FIG. 5B, the UE judges that a predetermined condition is satisfied, performs a detecting process of a DL grant in the remaining BD candidate, receives a PDSCH and feedbacks delivery acknowledgement information.

As described above, according to the first embodiment, even when repetitious transmission is applied to a control channel, it is possible to preferably prevent the occurrence of simultaneous reception in a plurality of NBs or simultaneous transmission in a plurality of NBs.

Second Embodiment

A second embodiment of the present invention relates to a method of configuring a control channel before RRC connection establishment (MPDCCH and/or PUCCH) for a UE which employs coverage enhancement (repetitious transmission is applied to).

Figure 6:
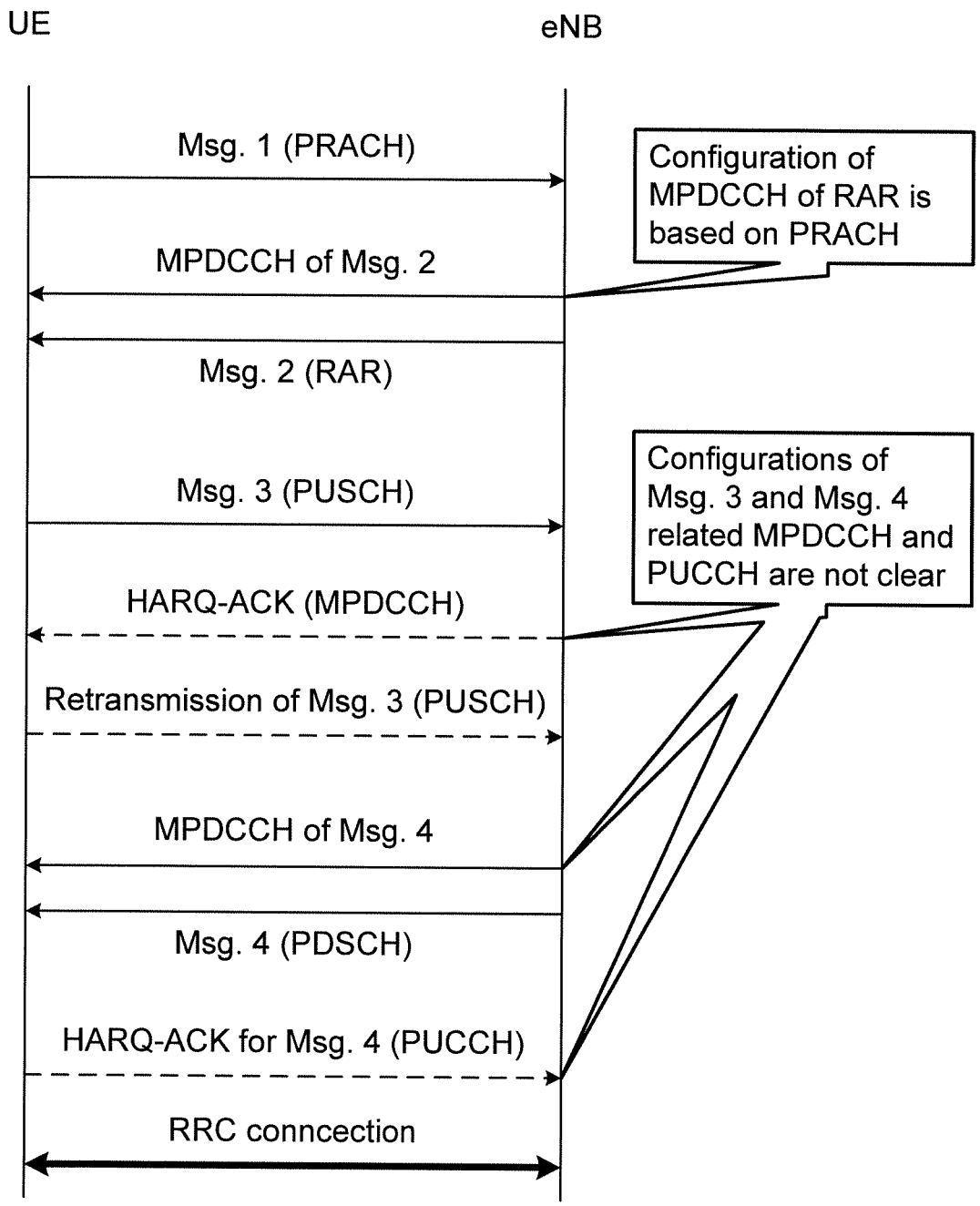
FIG. 6 is a sequence diagram to show an example of a random access procedure of an MTC terminal.

First, a random access procedure of a UE which employs coverage enhancement will be described with reference to FIG. 6. FIG. 6 is a sequence diagram to show an example of a random access procedure of an MTC terminal.

First, an UE determines a CE level for a PRACH (Physical Random Access Channel). The CE level can be determined based on the received power measured by the UE (for example, RSRP (Reference Signal Received Power)), the received quality (for example, RSRQ (Reference Signal Received Quality)), channel states and so on. Then, the UE transmits PRACHs in repetitions using the determined CE level.

Upon receiving the PRACH from the UE, an eNB transmits downlink control information (DCI) for an RAR (Random Access Response) to the UE using an MPDCCH at a predetermined CE level. The CE level of the MPDCCH may differ from the CE level of the PRACH. Note that, the structure of the MPDCCH for the RAR may be determined based on the PRACH (or the CE level of the PRACH).

When repetitious transmission of the PRACH has been completed, the UE attempts to receive DCI for an RAR corresponding to the PRACH (DCI used for identifying resources for receiving an RAR or DCI including an RAR) for a predetermined period. The period for attempting the reception of DCI for an RAR may be referred to as an "RAR window." When the reception of the MPDCCH for the RAR is not successful in the RAR window, the UE may retransmit the PRACH.

Meanwhile, the eNB, which identifies the PRACH from the UE, transmits DCI for the RAR to the UE at a predetermined timing. Transmitting DCI for the RAR to MTC terminals in a CSS (Common Search Space) for MTC terminals is under study. The CSS is formed with, for example, one or more PRBs in a predetermined narrow band. Note that a CSS for MTC terminals may be referred to as an "eCSS (enhanced CSS), an "MTC-CSS," and so on.

The DCI is scrambled with an identifier (RA-RNTI: Random Access Radio Network Temporary Identifier) corresponding to the PRACH transmitted from the UE. The RA-RNTI is calculated based on a transmission starting subframe of the PRACH and frequency resources of the PRACH (frequency position).

When the UE successfully receives (blind decodes) DCI for the RAR using an RA-RNTI corresponding to the PRACH transmitted in the RAR window, the UE continues the random access procedure. For example, the UE receives an RAR by the downlink resources (PDSCH) indicated by DCI for the RAR and then transmits message 3 (Msg.3) by the PUSCH using uplink resources indicated by the RAR. Note that the RAR may be reported by the PDSCH indicated by DCI of the MPDCCH, or reported by the MPDCCH alone.

When the eNB judges that the reception of message 3 has failed, the eNB may transmit delivery acknowledgement information using DCI in the USS in the MPDCCH. When the UE receives a NACK as delivery acknowledgement information, the UE retransmits message 3 by the PUSCH.

Upon receiving message 3, the eNB transmits a contention resolution message (message 4) to the UE. For message 4, the UE receives schedule information for receiving the PDSCH by the MPDCCH, and then receives a contention resolution identifier by the PDSCH based on the schedule information. Also, when the UE detects that the contention resolution identifier includes the identifier transmitted by message 3, the UE judges that contention resolution has been successful. Then, the UE transmits delivery acknowledgement information in response to message 4 using the PUCCH. Once synchronization with the eNB is secured by message 1 to 4, the UE completes the random access procedure and establishes an RRC connection.

As described above, the random access procedure in the UE includes communication using an MPDCCH or a PUCCH. Before the establishment of RRC connection, the UE does not know setting information for a USS in MPDCCH (for example, the frequency position of RBs, the repetition level, the starting subframe candidate, and so on), and therefore it is difficult for the UE to make a successful reception of the MPDCCH. Similarly, since neither the UE nor the eNB knows PUCCH setting information to be reported through RRC signaling (for example, the PUCCH repetition level, the PUCCH start offset, and so on), it is difficult for the eNB to make a successful reception of the PUCCH.

As described above, existing MTE terminals cannot carry out communication using an MPDCCH and/or a PUCCH in a random access procedure which is performed before the establishment of RRC connection adequately, and therefore there is a problem that the RRC connection cannot be established.

So, the present inventors have conceived that, in the random access procedure, the UE acquires information about repetitious reception of an MPDCCH (setting information for a USS) and information about repetitious transmission of a PUCCH (setting information for a PUCCH), and arrived at the second embodiment. To be more specific, in the second embodiment, the UE acquires, for example, one or more of repetition levels and the starting subframe candidate for the MPDCCH, and the repetition level and the start offset for the PUCCH, based on information about a configuration type and a predetermined relationship (mapping table) associated with the configuration type. Note that the configuration type may be referred to as an "MPDCCH/PUCCH configuration type."

FIG. 7 is a diagram to show an example of the relationship employed in the second embodiment. FIG. 7A shows an example of a mapping table associated with a configuration type. FIG. 7A shows an example of the relationship between three configuration types (Configuration 1 to 3) and information required for repetitious reception of the MPDCCH and/or repetitious transmission of the PUCCH.

For example, upon judging that configuration 1 is applied to the UE, the UE performs a receiving process, assuming that the MPDCCH repetition level is 5, 10, or 15 during MPDCCH blind decoding and that the MPDCCH starting subframe is X1, X2, or X3. Also, in PUCCH transmission, the UE performs a transmission process, assuming that the PUCCH repetition level (repetition number) is 20 and that the PUCCH start offset is N_1 (for example, represented as the number of RBs).

The UE may acquire the configuration type by, for example, at least one of the following methods (1) and (2): (1) acquiring information that represents the configuration type (for example, referred to as a "configuration index," or a "configuration type index") from bits (array) included in the RAR; (2) acquiring the configuration type based on the PRACH CE level.

In the case of method (1), the information that represents the configuration type may be explicitly included in the RAR, or may be implicitly included in information included in an existing RAR. In the case of method (2), the UE can identify the configuration type from the determined PRACH CE level based on the relationship between the PRACH CE level and the configuration type.

FIG. 7B shows the relationship between the PRACH CE level and the configuration type used in the above method (2). PRACH CE levels (PRACH CE level 1 to 3) correspond to configuration types (Configuration 1 to 3) respectively.

Note that, in the second embodiment, the UE may receive information about a predetermined relationship (mapping table) associated with the configuration type and/or information about the relationship between the PRACH CE level and the configuration type, through higher layer signaling (for example, RRC signaling, and broadcast information), downlink control information (DCI), or combination thereof. The UE can update the predetermined relationship using information about the reported relationship.

As described above, according to the second embodiment, since the UE can acquire information required for MPDCCH repetitious reception and/or PUCCH repetitious transmission, based on information that represents the configuration type, the UE can adequately perform a repetitious transmission and/or reception process of the MPDCCH or the PUCCH in the random access procedure and thereby establish RRC connection.

Third Embodiment

A third embodiment of the present invention relates to DCI format used in a downlink control channel (MPDCCH).

As described in the first embodiment, the UE performs DCI blind decoding in a search space. To reduce a load on the process of the UE, the number of blind decoding need to be reduced. However, in the discussion for Rel. 13, how to configure a DCI format used for the MPDCCH has not been under study.

First, the present inventors studied a DCI format used for the MPDCCH in MTC terminals. A transmission mode (TM) supported by MTC terminals is assumed to be TM 1, 2, and 9. Also, as the DCI format supported, DCI format 0 for a UL grant, and DCI format 1A, 1, and 2C for a DL grant may be possible. Then, the DCI size varies between normal coverage and enhanced coverage (because there is information that is unnecessary for enhanced coverage while being necessary for normal coverage). Also, a field included in the DCI may be different from existing DCI.

In light of the above, the present inventors have come up with the idea that it may be possible to employ the DCI format shown in FIGS. 8 to 11 for the MPDCCH in MTC terminals in Rel. 13. FIGS. 8 to 11 are diagrams to show an example of the configuration of Rel. 12 and the configuration of MTC terminal in Rel. 13 for DCI format 0, 1A, 1, and 2C. In each diagram, the expression "No need" stands for a field that is used in another configuration in the same diagram but is unnecessary for the targeted configuration. Also, the expression "FFS" represents a field that may be added in the future.

Furthermore, the present inventors have focused on the fact that the size of DCI formats varies depending on the presence or absence of a predetermined field of DCI (for example, the presence or absence of at least one field represented by the "FFS" in FIGS. 8 to 11) and coverage (normal coverage or enhanced coverage) to be employed to the UE. FIG. 12 is a diagram to show an example of DCI format size shown in FIGS. 8 to 11. FIG. 12 shows that the size of DCI formats varies depending on the presence or absence of an ARO (ACK/NACK Resource Offset) field of DCI, and coverage to be employed to the UE.

In view of the above, the present inventors have conceived of aligning the size of some DCI formats out of DCI formats used for the MPDCC, and arrived at the third embodiment. To be more specific, in the third embodiment, for each transmission mode, the sizes of all of the DCI formats supported by the MPDCCH in the transmission mode may be aligned (embodiment 3.1). Also, the sizes of plural pieces of DCI having a minimum size difference, among DCI formats used for the MPDCCH, may be aligned based on the transmission mode and coverage to be employed to the UE (embodiment 3.2).

FIG. 13 is a diagram to show an example of combinations of DCI formats for size alignment in the third embodiment. FIG. 13A is a diagram corresponding to embodiment 3.1. In FIG. 13A, for each transmission mode, the sizes of all the DCI formats supported are aligned regardless of coverage. To be more specific, in FIG. 13A, for transmission mode 1/2, size alignment is configured such that the sizes of DCI formats 1A, 1 and 0 are the same. Also, for transmission mode 9, size alignment is configured such that the sizes of DCI formats 1A, 2C, and 0 are the same.

In addition, FIG. 13B is a diagram corresponding to embodiment 3.2. In FIG. 13B, for each transmission mode, the sizes of a plurality of DCI formats having a minimum size difference are aligned based on coverage or a DCI format size. Note that, for enhanced coverage, FIG. 13B shows an example where DCI formats 1A, 1 and 2C include no ARO (w/o ARO), and an example where DCI formats 1A, 1 and 2C include an ARO (w/ARO). However, even when the presence or absence of another field is changed, the sizes of plural pieces of DCIs having a minimum size difference can be similarly aligned.

To be more specific, in FIG. 13B, in the case of normal coverage, for transmission mode 1/2, size alignment is configured such that the sizes of DCI formats 1A and 1 are the same. Also, for transmission mode 9, size alignment is configured such that the sizes of DCI formats 1A and 2C are the same.

Also, in FIG. 13B, when enhanced coverage is employed and DCI include no ARO, for each transmission mode, size alignment is configured such that the sizes of DCI formats 1A and 0 are the same. Also, when enhanced coverage is employed and DCI include an ARO, for transmission mode 1/2, size alignment is configured such that the sizes of DCI formats 1A and 1 are the same. Also, for transmission mode 9, size alignment is configured such that the sizes of DCI formats 1A and 0 are the same.

As described above, according to the third embodiment, a part or all of the sizes of DCI formats used for the MPDCCH can be made the same, so that it is possible to reduce the number of times of blind decoding for the MPDCCH.

Note that the radio communication methods of the above-described embodiments may be employed individually or may be employed in combination.

(Radio Communication System)

Now, the structure of the radio communication system according to an embodiment of the present invention will be described below. In this radio communication system, the radio communication methods according to the above-described embodiments of the present invention are employed. Note that the radio communication methods of the above-described embodiments may be applied individually or may be applied in combination. Here, although MTC terminals will be shown as an example of user terminals that are limited to using narrow bands as bands for their use, the present invention is by no means limited to MTC terminals.

Figure 14:
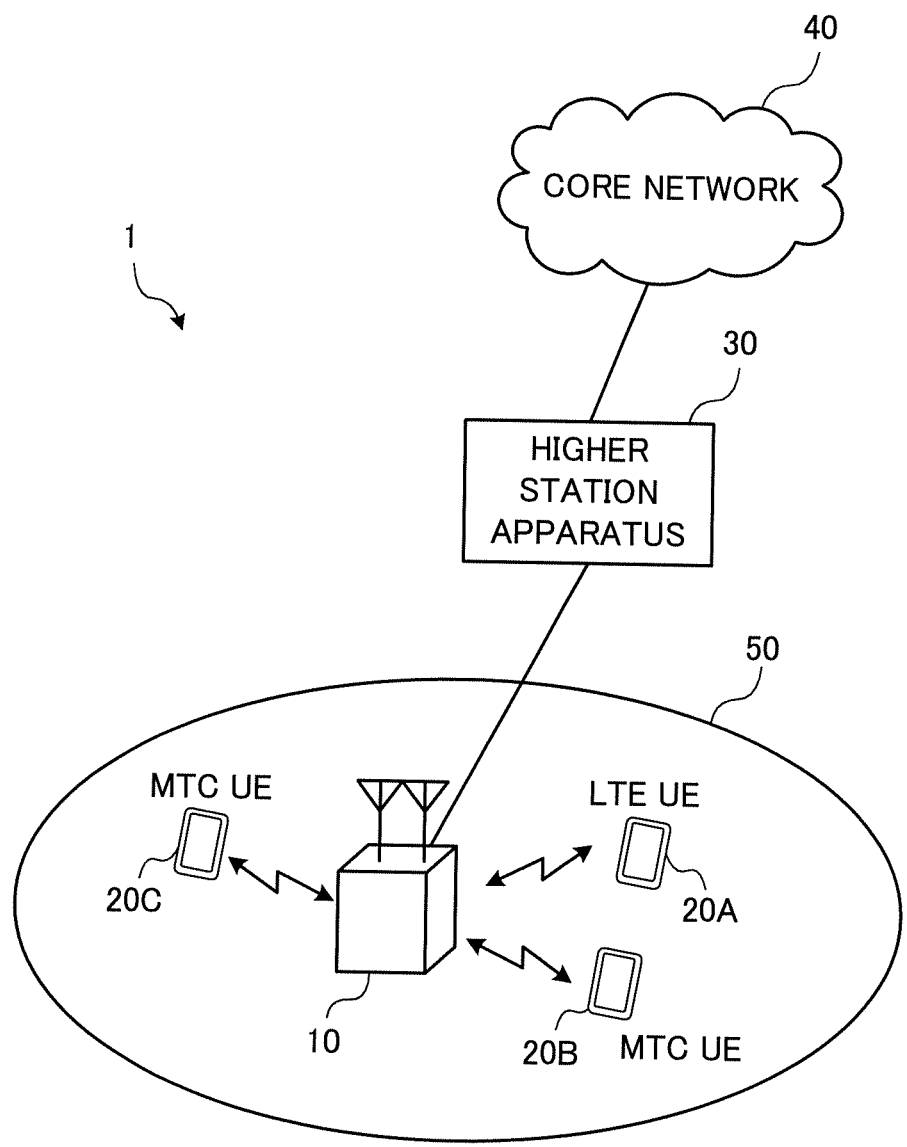
FIG. 14 is a diagram to show a schematic structure of a radio communication system according to an embodiment of the present invention.

FIG. 14 is a diagram to show a schematic structure of the radio communication system according to an embodiment of the present invention. The radio communication system 1 shown in FIG. 14 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the LTE system bandwidth constitutes one unit. Also, although, in this LTE system, the system band is configured to maximum 20 MHz in both the downlink and the uplink, this configuration is by no means limiting.

Note that the radio communication system 1 may be referred to as "LTE" (Long Term Evolution), "LTE-A" (LTE-Advanced), "LTE-B" (LTE-Beyond), "SUPER 3G," "IMT-Advanced," "4G" (4th generation mobile communication system), "5G" (5th generation mobile communication system), "FRA" (Future Radio Access), "new-RAT" (Radio Access Technology) and so on, or may be understood as a system to implement these.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminal 20A, 20B and 20C can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are MTC terminals that serve as communication devices in machine communication systems. Hereinafter the user terminals 20A, 20B and 20C will be each simply referred to as a "user terminal 20," unless specified otherwise.

Note that the MTC terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals 20 directly, or communicate with other user terminals 20 via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Also, uplink control information (UCI) such as downlink radio quality information (CQI: Channel Quality Indicator), delivery acknowledgement information (ACK/NACK) and so in is communicated by the PUCCH. By means of the PRACH, random access preambles for establishing connections with cells are communicated.

Note that the channels for MTC terminals may be shown with an "M," and, for example, EPDCCH, PDSCH, PUCCH and PUSCH for MTC terminals may be referred to as "MPDCCH," "MPDSCH," "MPUCCH," and "MPUSCH," respectively.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that, DMRSs may be referred to as "user terminal-specific reference signals" (UE-specific Reference Signals). Also, the reference signals to be communicated are by no means limited to these.

(Radio Base Station)

Figure 15:
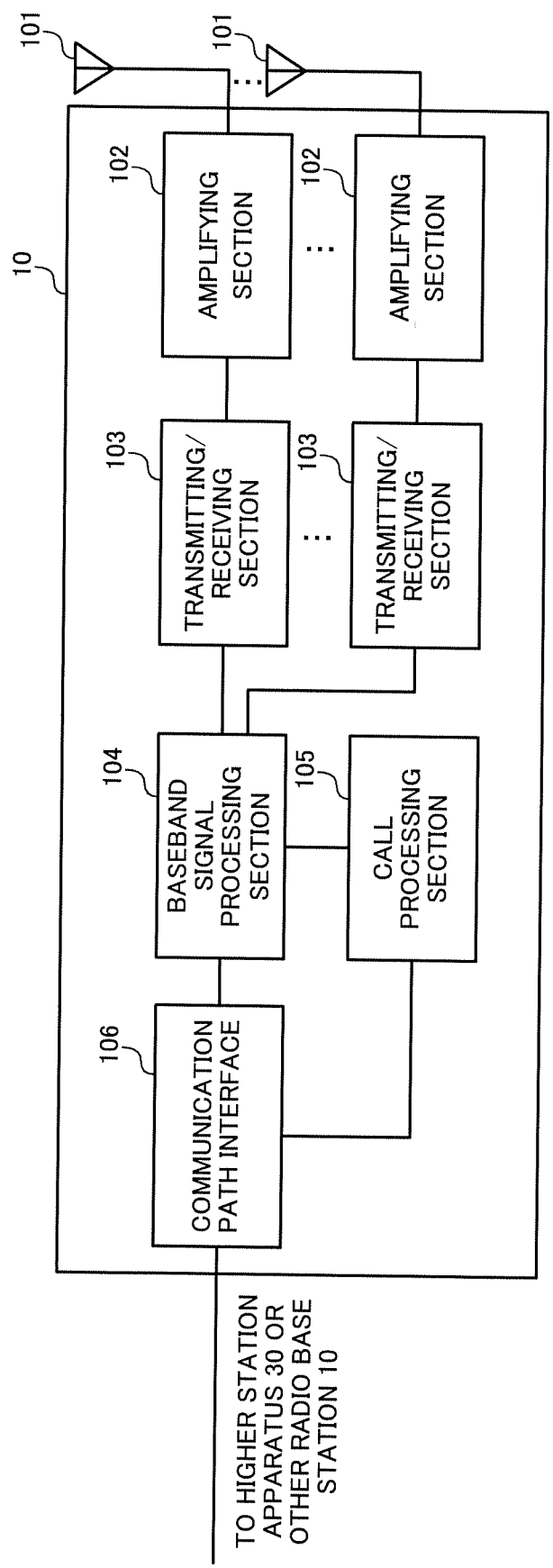
FIG. 15 is a diagram to show an example of an overall structure of a radio base station according to an embodiment of the present invention.

FIG. 15 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The transmitting/receiving sections 103 can be constituted by transmitters/receivers, transmitting/receiving circuits or transmitting/receiving devices that can be described based on common understanding of the technical field to which the present invention pertains. Note that a transmitting/receiving section 103 may be structured as a transmitting/receiving section in one entity, or may be constituted by a transmitting section and a receiving section.

The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and/or receive various signals in a narrow bandwidth (for example, 1.4 MHz) that is more limited than a system band (for example, one component carrier).

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (for example, an interface in compliance with the CPRI (Common Public Radio Interface)m such as optical fiber, the X2 interface).

Note that the transmitting/receiving sections 103 transmit MPDCCHs to the user terminal 20 in repetitions. Also, the transmitting/receiving sections 103 may transmit PDSCHs to the user terminal 20 in repetitions. Also, the transmitting/receiving sections 103 may transmit information about a predetermined relationship (mapping table) associated with the configuration type and/or information about the relationship between the CE level for the PRACH and the configuration type.

The transmitting/receiving sections 103 may receive at least one of the PRACH, the PUCCH, and the PUSCH from the user terminal 20 in repetitions.

Figure 16:
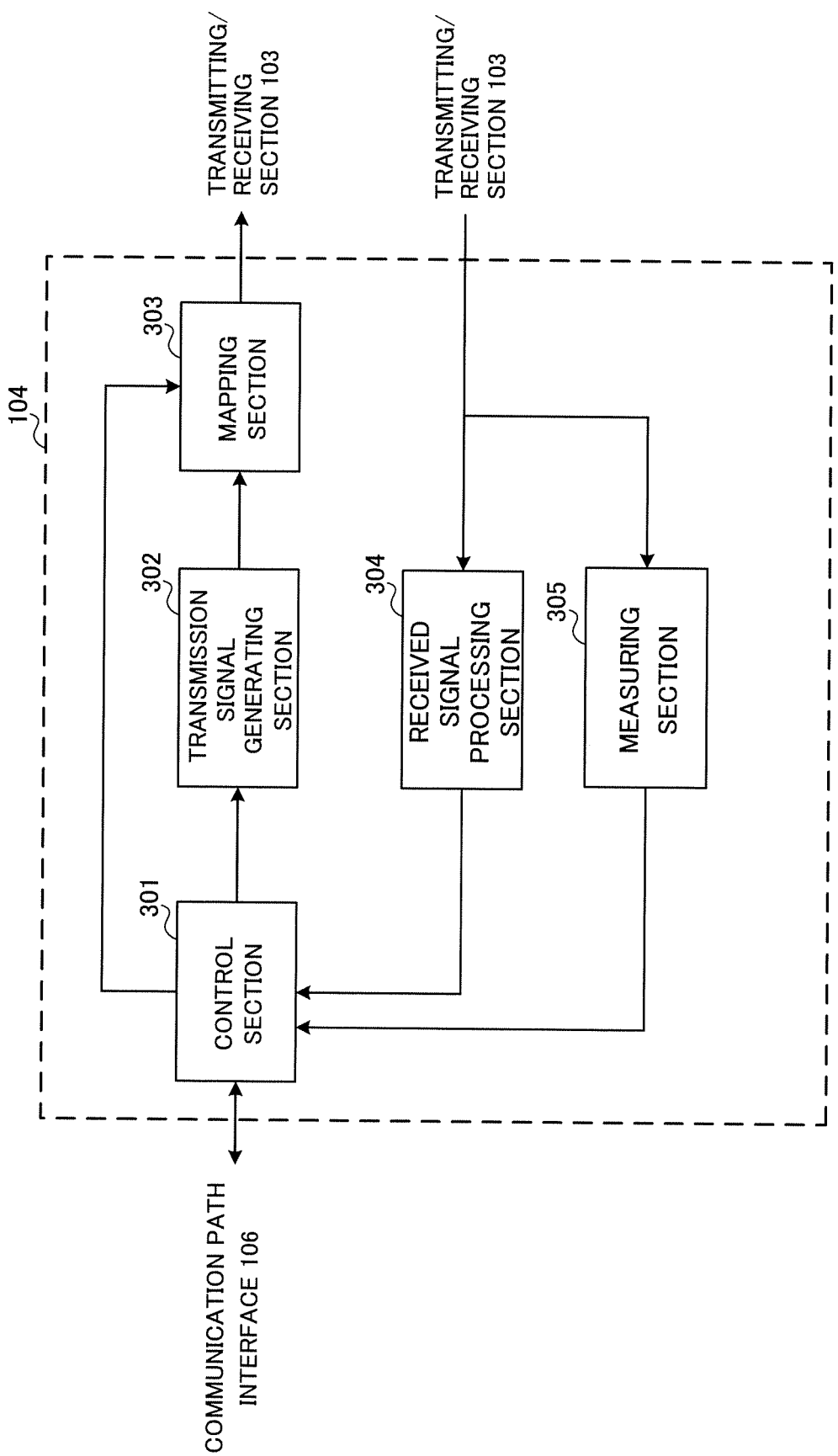
FIG. 16 is a diagram to show an example of a functional structure of a radio base station according to an embodiment of the present invention.

FIG. 16 is a diagram to show an example of a functional structure of a radio base station according to one embodiment of the present invention. Note that, although FIG. 16 primarily shows functional blocks that pertain to characteristic parts of the present embodiment, the radio base station 10 has other functional blocks that are necessary for radio communication as well. As shown in FIG. 16, the baseband signal processing section 104 has a control section (scheduler) 301, a transmission signal generating section (generation section) 302, a mapping section 303, a received signal processing section 304 and a measurement section 305.

The control section (scheduler) 301 controls the whole of the radio base station 10. The control section 301 can be constituted by a controller, a control circuit or a control device that can be described based on common understanding of the technical field to which the present invention pertains.

The control section 301, for example, controls the generation of signals in the transmission signal generating section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals that are transmitted in the PDSCH and downlink control signals that are communicated in the PDCCH and/or the EPDCCH, the MPDCCH, and so on. Also, the control section 301 controls the scheduling of downlink reference signals such as synchronization signals (for example, the PSS (Primary Synchronization Signal)/SSS (Secondary Synchronization Signal)), CRSs, CSI-RSs, DM-RSs and so on.

Also, the control section 301 controls the scheduling of uplink data signals transmitted in the PUSCH, uplink control signals transmitted in the PUCCH and/or the PUSCH (for example, delivery acknowledgement signals (HARQ-ACKs)), random access preambles transmitted in the PRACH, uplink reference signals and so on.

The control section 301 controls the transmission signal generating section 302 and the mapping section 303 to allocate various signals to a narrow band and transmit these to the user terminals 20. For example, the control section 301 controls downlink broadcast information (the MIB, SIBs (MTC-SIBs), etc.), the MPDCCH, the PDSCH and so on to be transmitted in a narrow band.

Also, the control section 301 transmits PDSCHs to the user terminals 20 in predetermined narrow bands. Note the, when the radio base station 10 employs coverage enhancement, the control section 301 may exert control so that DL/UL signal repetition numbers are configured in a predetermined user terminal 20, and DL signals are transmitted in repetitions/UL signals are received in repetitions based on these repetition numbers. Furthermore, the control section 301 may control information about the repetition number to be reported to the user terminal 20 in a control signal (DCI) in the MPDCCH or by using higher layer signaling (for example, RRC signaling, broadcast information, etc.).

Also, the control section 301 may control the transmission signal generating section 302 and the mapping section 303 for the reception of scheduling information (grant), considering repetitious transmission of a control channel, or another channel. For example, when the control section 301 has transmitted scheduling information for uplink transmission (for example, the PUSCH) and/or downlink reception (for example, the PDSCH) in a predetermined candidate region (BD candidate) in the same search space (SS), the control section 301 controls a transmission process of scheduling information in the remaining BD candidate (first embodiment).

To be more specific, when the control section 301 has already transmitted scheduling information by the BD candidate in the same SS, the control section 301 may control not to transmit scheduling information by the remaining BD candidate. Alternatively, the control section 301 may control whether to transmit scheduling information by the remaining BD candidate based on the repetition number.

Also, the control section 301 may control to transmit information used for downlink control channel (MPDCCH) repetitious reception and/or uplink control channel (PUCCH) repetitious transmission in a random access procedure in the user terminal 20 (second embodiment). For example, the control section 301 may report the information included in an RAR.

Also, the control section 301 may control a coding process so that, among DCI formats used for the downlink control channel (MPDCCH) in a predetermined search space, the sizes of at least two DCI formats are the same (third embodiment).

To be more specific, the control section 301 may control a coding process based on a transmission mode used for communication with the user terminal 20, so that, in DCI formats used for the downlink control channel (MPDCCH) in a predetermined search space, the sizes of all of the DCI formats are the same. Also, the control section 301 may control a coding process based on a transmission mode used for communication with the user terminal 20 and coverage applied to the user terminal 20, so that, among DCI formats used for the downlink control channel in a predetermined search space, the sizes of a plurality of DCI formats having a minimum size difference are the same.

The transmission signal generating section 302 generates downlink signals (downlink control signals, downlink data signals, downlink reference signals and so on) based on commands from the control section 301, and outputs these signals to the mapping section 303. The transmission signal generating section 302 can be constituted by a signal generator, a signal generating circuit or a signal generating device that can be described based on common understanding of the technical field to which the present invention pertains.

For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are selected based on channel state information (CSI) from each user terminal 20 and so on.

Also, when repetitious transmission of a downlink signal (for example, repetitious transmission of the MPDSCH, PDSCH, etc.) is configured, the transmission signal generating section 302 generates the same downlink signal over a plurality of subframes and outputs these signals to the mapping section 303.

The mapping section 303 maps the downlink signals generated in the transmission signal generating section 302 to predetermined narrow band radio resources (for example, maximum 6 resource blocks) based on commands from the control section 301, and outputs these to the transmitting/receiving sections 103. The mapping section 303 can be constituted by a mapper, a mapping circuit or a mapping device that can be described based on common understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or a signal processing device that can be described based on common understanding of the technical field to which the present invention pertains can be used.

The received signal processing section 304 outputs the decoded information acquired through the receiving processes to the control section 301. Also, the received signal processing section 304 outputs the received signals, the signals after the receiving processes and so on, to the measurement section 305.

The measurement section 305 conducts measurements with respect to the received signals. The measurement section 305 can be constituted by a measurer, a measurement circuit or a measurement device that can be described based on common understanding of the technical field to which the present invention pertains.

The received signal processing section 304 may measure the signal received power (for example, RSRP (Reference Signal Received Power)), the received quality (for example, RSRQ (Reference Signal Received Quality)), channel states and so on. The measurement results may be output to the control section 301.

(User Terminal)

Figure 17:
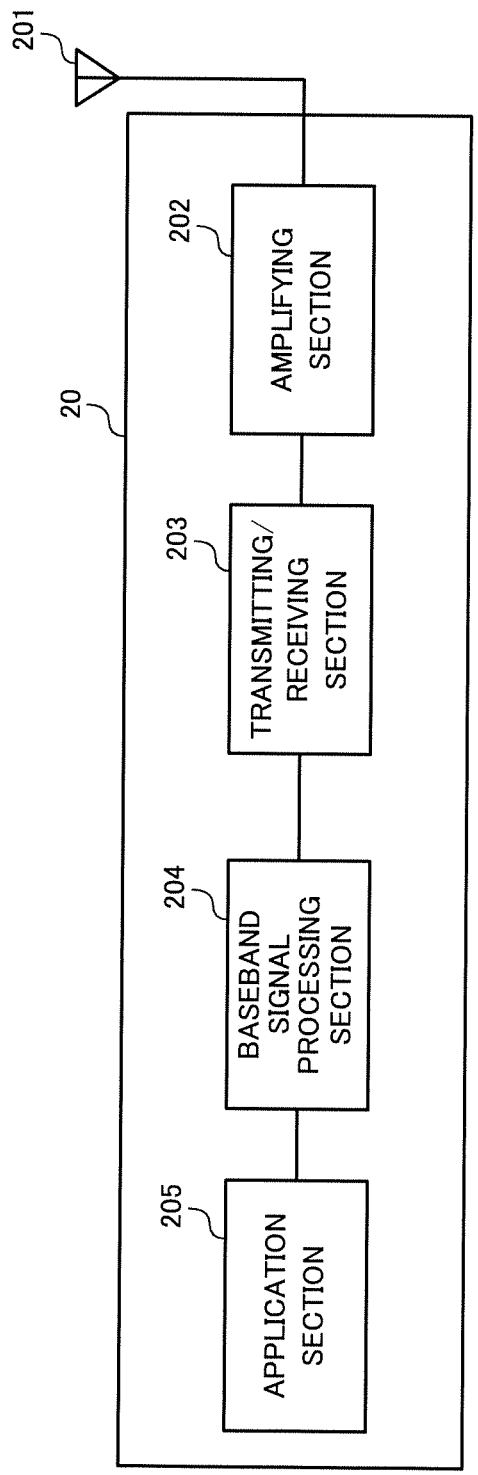
FIG. 17 is a diagram to show an example of an overall structure of a user terminal according to an embodiment of the present invention.

FIG. 17 is a diagram to show an example of an overall structure of a user terminal according to an embodiment of the present invention. Note that, although not described in detail herein, normal LTE terminals may operate to act as MTC terminals. A user terminal 20 has a transmitting/receiving antenna 201, an amplifying section 202, a transmitting/receiving section 203, a baseband signal processing section 204 and an application section 205. Also, the user terminal 20 may have a plurality of transmitting/receiving antennas 201, amplifying sections 202, transmitting/receiving sections 203 and/or others.

A radio frequency signal that is received in the transmitting/receiving antenna 201 is amplified in the amplifying section 202. The transmitting/receiving section 203 receives the downlink signal amplified in the amplifying section 202. The received signal is subjected to frequency conversion and converted into the baseband signal in the transmitting/receiving section 203, and output to the baseband signal processing section 204. The transmitting/receiving section 203 can be constituted by a transmitters/receiver, a transmitting/receiving circuit or a transmitting/receiving device that can be described based on common understanding of the technical field to which the present invention pertains. Note that the transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203.

The baseband signal that is output from the baseband signal processing section 204 is converted into a radio frequency bandwidth in the transmitting/receiving section 203. The radio frequency signal that is subjected to frequency conversion in the transmitting/receiving section 203 is amplified in the amplifying section 202, and transmitted from the transmitting/receiving antenna 201.

The transmitting/receiving section 203 receives MPDCCHs from the radio base station 10 in repetitions. Also, the transmitting/receiving section 203 may receive PDSCHs from the radio base station 10 in repetitions. The transmitting/receiving section 203 may also receive information about a predetermined relationship (mapping table) associated with the configuration type and/or information about the relationship between the PRACH CE level and the configuration type.

The transmitting/receiving section 203 may transmit at least one of the PRACH, the PUCCH, and the PUSCH to the radio base station 10 in repetitions.

Figure 18:
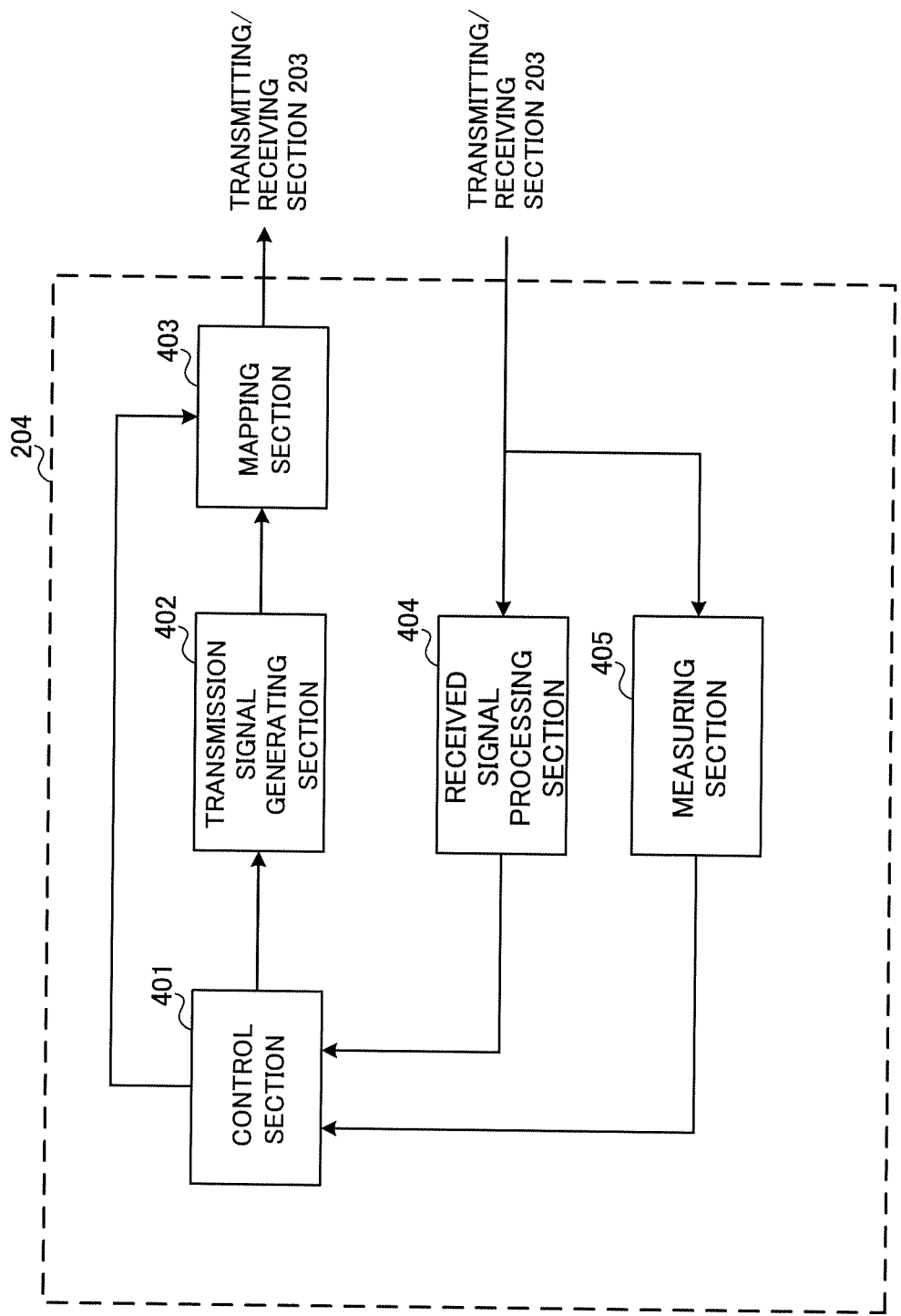
FIG. 18 is a diagram to show an example of a functional structure of a user terminal according to an embodiment of the present invention.

FIG. 18 is a diagram to show an example of a functional structure of a user terminal according to one embodiment of the present invention. Note that, although FIG. 18 primarily shows functional blocks that pertain to characteristic parts of the present embodiment, the user terminal 20 has other functional blocks that are necessary for radio communication as well. As shown in FIG. 18, the baseband signal processing section 204 provided in the user terminal 20 has a control section 401, a transmission signal generating section (generation section) 402, a mapping section 403, a received signal processing section 404 and a measurement section 405.

The control section 401 controls the whole of the user terminal 20. For the control section 401, a controller, a control circuit or a control device that can be described based on common understanding of the technical field to which the present invention pertains can be used.

The control section 401, for example, controls the generation of signals in the transmission signal generating section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals (signals transmitted in PDCCH/EPDCCH) and downlink data signals (signals transmitted in the PDSCH) transmitted from the radio base station 10, from the received signal processing section 404. The control section 401 controls the generation of uplink control signals (for example, delivery acknowledgement signals (HARQ-ACKs) and so on) and uplink data signals based on the downlink control signals, the results of deciding whether or not re transmission control is necessary for the downlink data signals, and so on. Also, the control section 401 controls a random access procedure, for example, random access preamble (PRACH) transmission.

Also, if the repetition number for an uplink signal (for example, the PUCCH and/or the PUSCH) is configured in the user terminal 20, the control section 401 exerts control so that signals carrying the same information are transmitted in repetitions over a plurality of subframes, based on information about the repetition level of a predetermined signal.

When information to indicate whether operation is in normal coverage mode or in coverage enhancement mode is input from the received signal processing section 404, the control section 401 can identify the subject terminal's mode based on this information. Also, the control section 401 may judge this mode based on the information about the repetition level.

Also, the control section 401 may control the received signal processing section 404 for the reception of scheduling information (grant), considering repetitious transmission for a control channel, or another channel. For example, when the control section 401 detects scheduling information about uplink transmission (for example, the PUSCH) and/or downlink reception (for example, the PDSCH) in a predetermined candidate region (BD candidate) in the same search space (SS), the control section 401 controls a decoding process in the remaining BD candidate (first embodiment).

To be more specific, when the control section 401 has already detected scheduling information in the BD candidate in the same SS, the control section 401 may control not to perform a decoding process in the remaining BD candidate, or may control whether to perform a decoding process in the remaining BD candidate based on the repetition number.

Also, in the random access procedure, the control section 401 may control downlink control channel (MPDCCH) repetitious reception and/or uplink control channel (PUCCH) repetitious transmission in a random access procedure, based on predetermined configuration information (second embodiment).

Also, the control section 401 may control to perform a decoding process, assuming that, among DCI formats used for a downlink control channel (MPDCCH) in a predetermined search space, the sizes of at least two DCI formats are the same (third embodiment).

To be more specific, the control section 401 may control to perform a decoding process based on a transmission mode configured (reported and/or used) by the radio base station 10, assuming that, in DCI formats used for a downlink control channel (MPDCCH) in a predetermined search space, the sizes of all of the DCI formats are the same. Also, the control section 401 may control a decoding process based on a transmission mode and coverage employed for the user terminal 20, assuming that, among DCI formats used for a downlink control channel in a predetermined search space, the sizes of a plurality of DCI formats having a minimum size difference are the same.

The transmission signal generating section 402 generates uplink signals (uplink control signals, uplink data signals, uplink reference signals and so on) based on commands from the control section 401, and outputs these signals to the mapping section 403. The transmission signal generating section 402 can be constituted by a signal generator, a signal generating circuit or a signal generating device that can be described based on common understanding of the technical field to which the present invention pertains.

For example, the transmission information generating section 402 generates uplink control signals such as delivery acknowledgement signals (HARQ-ACKs), channel state information (CSI) and so on, based on commands from the control section 401. Also, the transmission signal generating section 402 generates uplink data signals based on commands from the control section 401. For example, when a UL grant is included in a downlink control signal that is reported from the radio base station 10, the control section 401 commands the transmission signal generating section 402 to generate an uplink data signal.

Also, when the user terminal 20 is configured to transmit a predetermined uplink signal in repetitions, the transmission signal generating section 402 generates the same uplink signal over a plurality of subframes, and outputs these signals to the mapping section 403. The repetition number may be increased and/or decreased based on commands from the control section 401.

The mapping section 403 maps the uplink signals generated in the transmission signal generating section 402 to radio resources (maximum 6 resource blocks) based on commands from the control section 401, and outputs these to the transmitting/receiving sections 203. The mapping section 403 can be constituted by a mapper, a mapping circuit or a mapping device that can be described based on common understanding of the technical field to which the present invention pertains.

The received signal processing section 404 performs receiving processes (for example, demapping, demodulation, decoding and so on) of received signals that are input from the transmitting/receiving section 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or a signal processing device that can be described based on common understanding of the technical field to which the present invention pertains.

The received signal processing section 404 applies receiving processes for repeated signals to signals received from the radio base stations 10 that carry out repetitious signal transmission. For example, the received signal processing section 404 may perform the DCI (EPDCCH) decoding process by using predetermined identifiers, based on commands from the control section 401.

The received signal processing section 404 output the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

The measurement section 405 conducts measurements with respect to the received signals. The measurement section 405 can be constituted by a measurer, a measurement circuit or a measurement device that can be described based on common understanding of the technical field to which the present invention pertains.

The measurement section 405 may measure, for example, the received power (for example, RSRP), the received quality (for example, RSRQ), the channel states and so on of the received signals. The measurement results may be output to the control section 401.

Note that the block diagrams that have been used to describe the above embodiments show blocks in functional units. These functional blocks (components) may be implemented in arbitrary combinations of hardware and software.

Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "frequency carriers," "carrier frequencies," "cells" and so on.

Also, determining the radio resources for transmitting/receiving a predetermined signal may be seen as equivalent to, in other words, determining the resources (or schemes) to use to transmit/receive the predetermined signal, such as frequencies, time, codes and space. The transmission/receipt in this case may include receiving process (for example, demapping, demodulation, decoding, etc.)/transmission processes (for example, mapping, modulation, coding, etc.).

Also, the information and parameters described in this description may be represented in absolute values or in relative values with respect to a predetermined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The example s/embodiments illustrated in this description may be used individually or in combinations, and the mode of may be switched depending on the implementation. Also, a report of predetermined information (for example, a report to the effect that "X holds") does not necessarily have to be sent explicitly, and can be sent implicitly (by, for example, not reporting this piece of information).

Reporting of information is by no means limited to the example s/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining example s, and should by no means be construed to limit the present invention in any way.

The disclosure of Japanese Patent Application No. 2015-187498, filed on Sep. 24, 2015, including the specification, drawings and abstract, is incorporated herein by reference in its entirety.

The invention claimed is:

1. A terminal operating with a limited narrow bandwidth that is a part of a system band, the terminal comprising:
   a transmitting/receiving section that transmits and receives signals; and
   a control section that controls repetitive transmission of a physical uplink control channel in a random access procedure based on a coverage enhancement level for a random access channel and a parameter, corresponding to the coverage enhancement level, regarding the repetitive transmission of the physical uplink control channel in the random access procedure provided via higher layer signaling,
   wherein a radio base station reports information about a relationship between a number of repetitions of the physical uplink control channel and the coverage enhancement level to the terminal by utilizing at least one of the higher layer signaling and downlink control information (DCI),
   wherein the coverage enhancement level for the random access channel ranges from level 0 to 3,
   wherein the number of repetitions is applied to the repetitive transmission of the physical uplink control channel in the random access procedure, the physical uplink control channel being used to transmit hybrid automatic repeat request-acknowledgement (HARQ-ACK) in response to message 4 for the coverage enhancement level,
   wherein the control section performs the repetitive transmission of the physical uplink control channel with the number of repetitions based on both the coverage enhancement level and the message 4,
   wherein a number of subframes of a search space of a physical downlink control channel in the random access procedure is based on the number of repetitions, and
   wherein a size of a DCI format scheduling the message 4 is aligned with a size of another DCI format scheduling uplink transmission that is different from the DCI format scheduling the message 4, based on an HARQ-ACK resource offset field.

2. The terminal according to claim 1, wherein the control section determines the coverage enhancement level based on a measured reference signal received power (RSRP).

3. A radio base station communicating with a terminal that operates with a limited narrow bandwidth that is a part of a system band, the radio base station comprising:
   a transmitting/receiving section that transmits and receives signals; and
   a control section that controls transmission for the terminal via higher layer signaling of a parameter, corresponding to a coverage enhancement level for a random access channel, regarding repetitive transmission of a physical uplink control channel in a random access procedure,
   wherein the radio base station reports information about a relationship between a number of repetitions of the physical uplink control channel and the coverage enhancement level to the terminal by utilizing at least one of the higher layer signaling and downlink control information (DCI),
   wherein the coverage enhancement level for the random access channel ranges from level 0 to 3,
   wherein the number of repetitions is applied to the repetitive transmission of the physical uplink control channel in the random access procedure, the physical uplink control channel being used to transmit hybrid automatic repeat request-acknowledgement (HARQ-ACK) in response to message 4 for the coverage enhancement level,
   wherein the repetitive transmission of the physical uplink control channel with the number of repetitions is based on both the coverage enhancement level and the message 4,
   wherein a number of subframes of a search space of a physical downlink control channel in the random access procedure is based on the number of repetitions, and
   wherein a size of a DCI format scheduling the message 4 is aligned with a size of another DCI format scheduling uplink transmission that is different from the DCI format scheduling the message 4, based on an HARQ-ACK resource offset field.

4. A radio communication method for a terminal operating with a limited narrow bandwidth that is a part of a system band, the radio communication method comprising:
   transmitting and receiving signals; and
   controlling repetitive transmission of a physical uplink control channel in a random access procedure based on a coverage enhancement level for a random access channel and a parameter, corresponding to the coverage enhancement level, regarding the repetitive transmission of the physical uplink control channel in the random access procedure provided via higher layer signaling,
   wherein a radio base station reports information about a relationship between a number of repetitions of the physical uplink control channel and the coverage enhancement level to the terminal by utilizing at least one of the higher layer signaling and downlink control information (DCI),
   wherein the coverage enhancement level for the random access channel ranges from level 0 to 3,
   wherein the number of repetitions is applied to the repetitive transmission of the physical uplink control channel in the random access procedure, the physical uplink control channel being used to transmit hybrid automatic repeat request-acknowledgement (HARQ-ACK) in response to message 4 for the coverage enhancement level,
   wherein the repetitive transmission of the physical uplink control channel with the number of repetitions is based on both the coverage enhancement level and the message 4,
   wherein a number of subframes of a search space of a physical downlink control channel in the random access procedure is based on the number of repetitions, and
   wherein a size of a DCI format scheduling the message 4 is aligned with a size of another DCI format scheduling uplink transmission that is different from the DCI format scheduling the message 4, based on an HARQ-ACK resource offset field.

* * * * *